INVENTOR.
LUBOMYR KURYLKO
HERBERT M. SCHOEN
BY
ATTORNEYS

United States Patent Office 2,876,637
Patented Mar. 10, 1959

2,876,637

VISCOSIMETER COMPRISING ORIFICED BAFFLES AT INTERVALS ALONG A FLUID PASSAGE

Lubomyr Kurylko, New York, N. Y., and Herbert M. Schoen, Stamford, Conn., assignors, by mesne assignments, to the United States of America as represented by the Secretary of the Navy Application September 9, 1957, Serial No. 683,199

3 Claims. (Cl. 73—56)

The present invention pertains to the art of determining the viscosity of fluids, with particular reference to viscous fluids.

The invention comprises a viscosimeter that is of simple construction, is readily portable, is operated easily by unskilled personnel, and is adapted particularly for field use to determine the viscous properties of materials.

The viscosimeter of the present invention comprises a tube of predetermined length that is open at its opposite ends, thus providing an inception or incipient and a discharge end, respectively. Near the discharge end of the tube, a plurality of baffles extend across the passage of the tube, and are located spaced apart at predetermined intervals lengthwise of the tube. Each baffle constitutes a partition, and neighboring partitions define a chamber inside the tube. There are several such chambers in succession along the tube, in the preferred embodiment of the disclosure. The last of the several baffles is located at or near the discharge end of the tube.

Each baffle is perforated to provide an aperture or orifice of predetermined area and contour. Material flowing towards the discharge end of the tube passes through the orifices of the several baffles in succession, and is retarded at each baffle because the orifice thereof is a constriction in the tube passage.

Orifice areas are progressively smaller, in successive baffles, from the innermost baffle that is nearest the inception or incipient end of the tube to the outermost baffle that is at the discharge end of the tube. This structure operates to trap material in successive chambers. Each orifice resists flow of material into the next chamber, resistance of successively smaller orifices being increased progressively along the tube. The rate of material flow is controlled thereby, to govern the factor of retardation that is a function of the viscosity of material flowing through the tube.

The inside wall of the tube is smooth, and constitutes a straight-line bore from the extremity of the incipient end of the tube to the first or innermost baffle along the tube. This space contains the material being tested, which is propelled along the tube and through successive baffles under a predetermined force, and the material flows out of the tube at its discharge end when it passes the last of the several successive baffles. The rate of flow of material through the tube, measured by the time interval required for a predetermined quantity of material to pass along the tube, is a function of the retardation of flow, and thereby measures viscosity.

The accompanying drawing discloses one practical embodiment of the invention. In the drawing Fig. 1 is a side elevation of an instrument embodying the invention. Fig. 1 is partly in section to illustrate the invention more clearly, and shows the instrument in the position of its operation;

Figure 1:
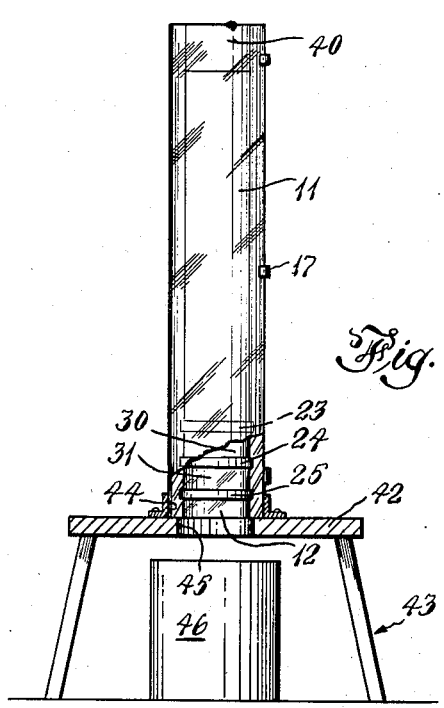

The instrument of the drawing comprises a tube consisting of halves 11 and 12, which divide the tube along a diametrical plane.

Figure 4:
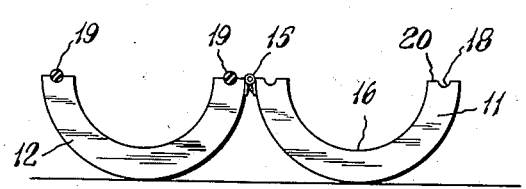
Fig. 4 is an end view of the instrument of Fig. 1, looking upwardly in Fig. 3, with the instrument in open condition.

Hinge 15 extends along the length of the tube and joins halves 11 and 12 to each other, enabling the tube to be opened as seen in Fig. 4. When the tube is closed, it comprises smooth bore 16. Spring clips 17 are positioned at intervals along the length of the tube 11, 12, and engage the outside surfaces of the halves 11 and 12 to constitute a securing device that holds the tube in closed condition. Bore 16 is sealed by grooves 18 containing lengths 19 of rubber or the like material extending along companion contacting faces 20 in the diametrical plane between halves 11 and 12. Material is prevented thereby from escaping through the sealed walls of the tube when such tube is held by clips 17.

Innermost baffle 23, with intermediate baffle 24 adjacent thereto, and outermost baffle 25 adjacent to baffle 24, are positioned in tube 11, 12 near the extremity 26 of its discharge end, and are located at predetermined intervals lengthwise of the tube. When tube 11, 12 is closed, it forms a cylinder, and comprises smooth bore 16 extending continuously from extremity 27 of its inception end to the inside or approach face 28 of baffle 23. Opposite end faces 26 and 27 of tube 11, 12 are squared, and are disposed parallel to each other.

Baffles 23, 24 and 25 constitute discs, which fit each into its companion annular groove in the inside wall of tube 11, 12, constituting bore 16 extended to discharge extremity 26. The several grooves are positioned along the length of tube 11, 12 to locate their respective baffles at their desired positions near the discharge extremity of the tube, and spaced apart according to the predetermined desired intervals between successive baffles. The space between baffles 23 and 24 constitutes a chamber 30 inside the tube, of which baffles 23 and 24 are opposite partitions, and which is located in the tube towards its discharge end away from its inception end. Chamber 31 succeeds chamber 30, and is constituted between the opposite partitions of baffles 24 and 25. Chamber 31 is located along the length of tube 11, 12 adjacent to its discharge end 26.

Each of the several partitions 23, 24 and 25 is perforated to provide a passage through the partition. Each passage constitutes a constriction of the passage for material flowing through the tube, and each perforation in the disclosed structure constitutes an aperture. Apertures 33, 34 and 35 of respective orifices are each of a size and contour that is predetermined to produce the desired degree of retardation of the flow of material. Orifice areas of successive apertures 33, 34 and 35 are reduced progressively to increase the retardation progressively, and to trap material in successive chambers 30 and 31.

A chamfer 36, 37 and 38 of each of the respective apertures 33, 34 and 35, in the trailing face of its corresponding baffle 23, 24 and 25, constitutes a sharp peripheral edge of the aperture in the plane of the approach face of its corresponding disc 23, 24 and 25 respectively. The wall surface of each orifice in the direction of material flow is reduced thereby to the thickness of a peripheral line. Surface friction caused by material flowing through any given baffle is thus eliminated as a factor of retardation.

The several apertures 33, 34 and 35 are located centrally in their respective discs of their corresponding baffles 23, 24 and 25, and are positioned coaxially with the tube.

Figure 2:
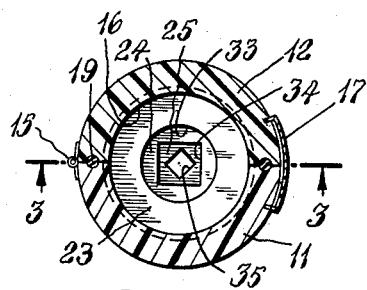
Fig. 2 is a cross-sectional plan, taken on line 2—2 of Fig. 3.

In one embodiment of the invention, orifice 33 is circular, and is one-and-one-quarter inches in diameter, tube 11, 12 having a bore of two-inches diameter. Orifice 34 of succeeding baffle 24 is three-quarters inches square. Contours of succeeding orifices are varied, as illustrated by circular orifice 33 followed by square orifice 34, to change the shape of the stream and thereby to avoid channeling. Orifice 35 of baffle 25 is three-eighths inches square, and is displaced rotatably forty-five degrees with reference to orifice 34, as seen in Fig. 2, to change the shape of the stream and avoid channeling.

The specifically described structure, and the dimensions specified, were devised particularly to measure viscosity of foam, and to determine comparative viscosities of several foam materials. The invention can be used to determine viscosities of other materials, including materials other than foam. The specifically disclosed dimensions, which were devised particularly for measuring viscosity of foam, can be varied within the scope of the invention, and the instrument modified in other particulars, for measuring viscosities of other materials than those with which the invention was actually reduced to practice. In the disclosed embodiment, each baffle is one-quarter inch thick, and there is one inch space between proximate faces of adjacent baffles 23 and 24, as also between 24 and 25. There is space of one-half inch between discharge extremity 26 of tube 11, 12 and the proximate face of baffle 25. The distance between incipient extremity 27 of tube 11, 12 and the inner or leading face 28 of innermost baffle 23 is thirteen-and-three-quarter inches.

Bore 16 is filled with material being tested, from leading face 28 of innermost baffle 23 to incipient extremity 27 of tube 11, 12, and the material then is propelled towards and through the discharge end at extremity 26 of the tube under a predetermined force, which preferably is maintained constant. The time interval that is required for a predetermined quantity of the material to travel a predetermined distance along tube 11, 12 is measured, and this time interval constitutes a measurement of the viscosity of the material. The time interval of a given test is the only measurement that the operator needs to record to determine the viscosity of the material tested. A weight is employed to apply the constant propelling force.

Plunger 40 fits bore 16, and therefore is two inches in diameter. Plunger 40 is one inch long. Tube 11, 12 is held in its upright position of Fig. 3, with its discharge end at 26 directed downwardly. With material filled into bore 16 from approach face 28 of baffle 23 to inception end 27 of tube 11, 12, plunger 40 now is inserted into bore 16 at its inception end. Plunger 40 begins to descend immediately by the force of gravity, driving the material downwardly through orifices 33, 34 and 35 of respective baffles 23, 24 and 25 in succession.

In the practical application of the invention of testing the viscosity of different foams, the time intervals of different tests varied within limits that were deemed undesirably wide. A short time interval of test is desired to avoid drainage effects of foam on its viscosity, as also to reduce film effects of foam between the plunger 40 and the wall of bore 16 which may affect the reliability of comparative tests between different foam materials. Therefore, it was desired that no time interval of any test be longer than one minute.

Several plungers of respectively different weights were provided for testing foam, all having the same dimensions as plunger 40 shown in the drawing. The several plungers are made of different materials, consisting of iron, aluminum, and plastic of lighter weight, respectively. The several plungers weighed 400 grams, 147 grams, and 60 grams, respectively.

The heavier iron plunger was used for testing the most viscous of the foams tested, to bring the time interval of all tests within the maximum desired time of one minute.

The lighter plastic plunger was used for testing the most fluid foams. The factor of human error in manually starting and stopping a stop watch is rendered negligible by making all time intervals of tests at least as high as a predetermined minimum. The time interval of testing the most fluid of the foams that were tested was raised to one-tenth of a minute or more by means of the plastic plunger.

The aluminum plunger was employed for testing foams in a range between the most and least viscous. By this means of the several plungers 40 of different weights, the time interval of all tests were maintained within a range between one-tenth of a minute and one minute.

To operate the instrument of the invention, the operator opens tube 11, 12 to the position shown in Fig. 4. He then places the several baffles 23, 24 and 25 in their respective companion grooves, positioned relative to each other as shown in Fig. 2. The operator then fills bore 16 of the tube 11, 12 with the material to be tested from the approach face 28 of baffle 23 to the incipient end of the tube at 27. After filling the two halves 11 and 12 to the level of surfaces 20 in Fig. 4, the operator closes the tube and clamps it shut by means of spring clips 17.

Figure 3:
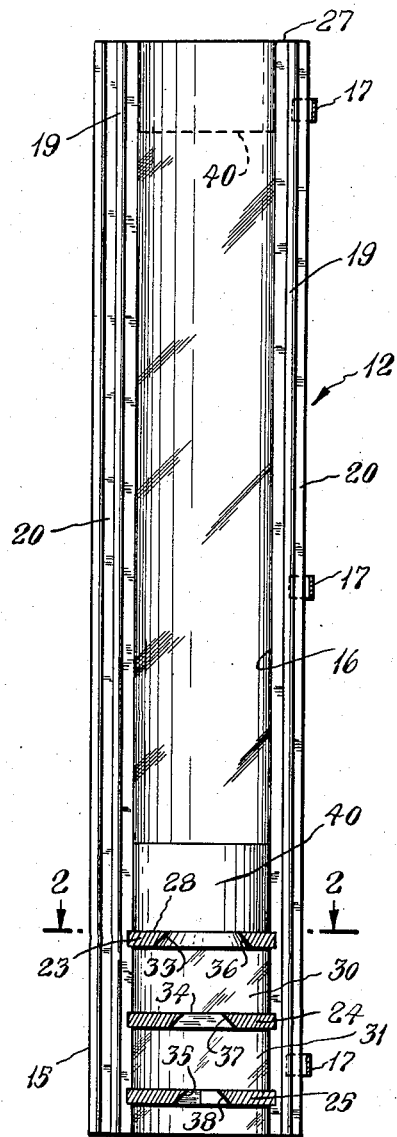
Fig. 3 is a cross-sectional elevation of the instrument of Fig. 1, taken on line 3—3 of Fig. 2.

Now the operator positions tube 11, 12 upright in the position of Fig. 3, and inserts plunger 40 in bore 16 into the extremity at 27 of the incipient end of the tube. The operator may hold the tube upright in his one hand, while he operates a stop watch manually with the other hand. The preferred material of tube 11, 12 is any suitable transparent plastic, which enables the operator to observe the descent of plunger 40 in the tube. The operator starts the stop watch when plunger 40 passes any suitable datum point along the length of the tube. For example, a suitable starting point can be the moment when the top surface of plunger 40 reaches extremity 27 of the tube, as appears in dotted lines in Fig. 3. The operator stops the stop watch when plunger 40 reaches any other suitable datum point along tube 11, 12. For example, a suitable stopping point can be the moment when the plunger is stopped by face 28 of baffle 23, and occupies the full line position of Fig. 3.

It will be observed that operation of the instrument of the invention is simple, and can be performed with complete satisfaction by unskilled persons who are taught correct operation and procedural standards from simple written instructions. The instrument is cleaned readily after each test, and contamination as a factor of error is eliminated thereby. The instrument of the disclosed embodiment has been correlated with reference to prior art viscosimeters that are known to be accurate, and the accuracy of the simple instrument has been proven thereby.

With reference to a given material being tested, the operator is required to record the time interval of the test only. If conditions that applicant encountered in testing foam should prevail, several plungers of different weights can be employed. In such case, the operator is required to indicate the particular plunger that he used for any given tests. This data is all that a person needs to compare viscosities of several materials.

The instrument of the invention is readily portable, and thereby can be taken into the field for use. By tests being made in the field and evaluated elsewhere, the material to be tested is not required to be transported to be tested at the central location where the studies are being made. In the case of foam being the material that is tested, drainage effects are magnified by transportation, and drainage effects that make test results unreliable are eliminated by use of the instrument of the invention in the field.

If it is desired, tube 11, 12 can be rested with its discharge end 26 bearing on any flat surface while plunger 40 descends in the tube, instead of being held in the hand. The tube can be positioned on the flat top 42 of table 43, for example, as illustrated in Fig. 1. Table top 42 is provided with locating ledge 44, which positions tube 11, 12 over hole 45 of the table top. As plunger 40 descends in tube 11, 12 towards baffle 23, the material that is discharged out of the end 26 of the tube through baffle 25 falls through hole 45 of table 43, into waste container 46.

The scope of the invention, one embodiment of which is shown in the drawing, is determined by the accompanying claims.

1. In a viscosimeter, a tube of predetermined length comprising open opposite incipient and discharge ends respectively, a plurality of baffles near the discharge end of the tube positioned in succession spaced apart at predetermined intervals along the tube and comprising an outermost baffle at the discharge end of the tube and an innermost baffle inwardly therefrom in the tube, each baffle being perforated to constitute an orifice of predetermined area through the baffle, orifices of the several baffles comprising each a single aperture located coaxially of the tube, peripheral contours of apertures of the several baffles being varied to change the shape of the stream flowing through a baffle from the aperture of its previous baffle, orifices areas of successive baffles from the innermost to the outermost baffles diminishing progressively, inside walls of the tube from the innermost baffle to the extremity of the incipient end thereof constituting a smooth bore of predetermined length and uniform cross-sectional area throughout its length, and a plunger of predetermined weight fitting the bore to travel along the tube.

2. In a viscosimeter as defined in claim 1, the several baffles comprising at least three in succession to constitute at least two successive chambers along the tube.

3. In a viscosimeter as defined in claim 1, the tube comprising two halves divided along a diametrical plane with companion faces of contact between the halves, a securing device operable to hold the tube in closed condition and releasable alternatively to part the tube halves and open the tube, a seal along companion faces of contact between tube halves to close the walls of the tube fluid-tight.

References Cited in the file of this patent

UNITED STATES PATENTS

| | | |
|---|---|---|
| 989,822 | Strasburger | April 18, 1911 |
| 1,826,732 | Chatillon | Oct. 13, 1931 |

FOREIGN PATENTS

| | | |
|---|---|---|
| 577,578 | Germany | June 1, 1933 |